US008998696B2

(12) United States Patent
Fong et al.

(10) Patent No.: US 8,998,696 B2
(45) Date of Patent: Apr. 7, 2015

(54) GAMING SYSTEM AND A METHOD OF GAMING

(75) Inventors: Colin Fong, Penshurst (AU); Peter Woodlock, Newtown (AU)

(73) Assignee: Aristocrat Technologies Australia Pty Limited (AU)

( * ) Notice: Subject to any disclaimer, the term of this patent is extended or adjusted under 35 U.S.C. 154(b) by 28 days.

(21) Appl. No.: 13/071,775

(22) Filed: Mar. 25, 2011
(Under 37 CFR 1.47)

(65) Prior Publication Data

US 2012/0052940 A1 Mar. 1, 2012

(30) Foreign Application Priority Data

Apr. 6, 2010 (AU) ................................ 2010901441

(51) Int. Cl.
*G06F 17/00* (2006.01)
*G07F 17/32* (2006.01)

(52) U.S. Cl.
CPC ........ *G07F 17/3274* (2013.01); *G07F 17/3258* (2013.01)

(58) Field of Classification Search
USPC ................................................ 463/42, 43, 16
See application file for complete search history.

(56) References Cited

U.S. PATENT DOCUMENTS

| | | | | |
|---|---|---|---|---|
| 4,687,199 | A | 8/1987 | Aguirregomezcorta | |
| 5,018,736 | A | 5/1991 | Pearson et al. | |
| 5,611,730 | A | 3/1997 | Weiss | |
| 6,039,648 | A | 3/2000 | Guinn et al. | |
| 6,406,371 | B1 | 6/2002 | Baba et al. | |
| 6,656,047 | B1 | 12/2003 | Tarantino et al. | |
| 8,292,720 | B2 * | 10/2012 | Davis et al. | 463/17 |
| 2002/0037767 | A1 | 3/2002 | Ebin | |
| 2003/0114218 | A1 | 6/2003 | McClintic | |
| 2006/0046874 | A1 | 3/2006 | Patrick | |
| 2006/0072594 | A1 | 4/2006 | Swamy | |
| 2006/0138728 | A1 | 6/2006 | Gordon et al. | |
| 2006/0232012 | A1 | 10/2006 | Boyer | |
| 2006/0252532 | A1 | 11/2006 | Stovall | |
| 2006/0252535 | A1 | 11/2006 | Ishihata et al. | |
| 2006/0258450 | A1 | 11/2006 | Ishihata et al. | |
| 2007/0060321 | A1 * | 3/2007 | Vasquez et al. | 463/27 |
| 2007/0156267 | A1 | 7/2007 | Nozaki | |
| 2007/0200296 | A1 | 8/2007 | Riolo | |
| 2008/0220857 | A1 | 9/2008 | Kelly et al. | |

(Continued)

FOREIGN PATENT DOCUMENTS

| | | | |
|---|---|---|---|
| AU | 2009208084 | A1 | 10/2009 |
| GB | 257126 | A | 8/1926 |

(Continued)

OTHER PUBLICATIONS

"Showcases", http://game-shows.chris-place.com/shows/price-is-right/showcases.htm. Created Feb. 3, 2008. Accessed Jun. 13, 2012.*

*Primary Examiner* — Reginald Renwick
(74) *Attorney, Agent, or Firm* — McAndrews, Held & Malloy, Ltd.

(57) ABSTRACT

A gaming system comprising a plurality of linked gaming devices each individually operable to play a main game and a group game, whereby the group game is played by at least two teams of players of the linked gaming devices; and a group game controller arranged to conduct the group game upon initiation for the at least two teams and to determine which team is to be awarded a prize at completion of the group game.

29 Claims, 8 Drawing Sheets

(56) References Cited

U.S. PATENT DOCUMENTS

| | | | | |
|---|---|---|---|---|
| 2008/0305867 | A1 | 12/2008 | Guthrie | |
| 2009/0042644 | A1 | 2/2009 | Zielinski | |
| 2009/0117962 | A1 | 5/2009 | Filipour et al. | |
| 2009/0124320 | A1* | 5/2009 | DeWaal | 463/16 |
| 2009/0124363 | A1* | 5/2009 | Baerlocher et al. | 463/27 |
| 2009/0149248 | A1 | 6/2009 | Busey et al. | |
| 2009/0176576 | A1 | 7/2009 | Billmaier et al. | |
| 2009/0191937 | A1 | 7/2009 | Sum et al. | |
| 2009/0239610 | A1 | 9/2009 | Olive et al. | |
| 2009/0305791 | A1 | 12/2009 | Uemura et al. | |
| 2009/0325697 | A1 | 12/2009 | Yamaguchi et al. | |

FOREIGN PATENT DOCUMENTS

| | | | |
|---|---|---|---|
| GB | 551347 | A | 2/1943 |
| JP | 2001129260 | A | 5/2001 |
| MX | 9701780 | A | 10/1997 |
| NZ | 510850 | A | 5/2003 |
| WO | 9952612 | A1 | 10/1999 |
| WO | 0064545 | | 11/2000 |
| WO | 0136059 | A1 | 5/2001 |
| WO | 2006076528 | A2 | 7/2006 |
| WO | 2008020346 | A2 | 2/2008 |
| WO | 2008115858 | A1 | 9/2008 |
| WO | 2009140155 | A1 | 11/2009 |

* cited by examiner

GAMING SYSTEM AND A METHOD OF GAMING

RELATED APPLICATIONS

This application claims priority to Australian Patent Application No. 2010901441, having a filing date of Apr. 6, 2010, which is incorporated herein by reference in its entirety.

FEDERALLY SPONSORED RESEARCH OR DEVELOPMENT

[Not Applicable]

[MICROFICHE/COPYRIGHT REFERENCE]

[Not Applicable]

BACKGROUND OF THE INVENTION

The present invention relates to a gaming system and a method of gaming.

Current electronic gaming machines allow a player to place a wager or bet, in return for which a play of a game provided by the gaming machine is conducted. Some gaming machines allow entry into a further game, such as a community or group game conducted for eligible players of the gaming machines. In this case, the community or group game may comprise a different game to the base game with different rules.

While such gaming systems provide users with enjoyment, a need exists for alternative gaming systems to provide users with further enjoyment.

BRIEF SUMMARY OF THE INVENTION

In a first aspect, the invention provides a gaming system comprising:

a plurality of linked gaming devices each individually operable to play a main game and a group game, whereby the group game is played by at least two teams of players of the linked gaming devices; and a group game controller arranged to conduct the group game upon initiation for the at least two teams and determine which team is to be awarded a prize at completion of the group game.

In an embodiment, the prize is at least one progressive jackpot.

In an embodiment, each team contributes to the or each progressive jackpot.

In an embodiment, each team contributes to a corresponding team progressive jackpot of the at least one progressive jackpot.

In an embodiment, the group game controller is further arranged to determine whether one of the at least two teams is to be awarded the progressive jackpot corresponding to another team.

In an embodiment, the determination of whether one of the at least two teams is to be awarded the progressive jackpot corresponding to another team is based on respective values of contributions of the teams to the respective corresponding team progressive jackpots.

In an embodiment, the group game controller is further arranged to determine whether one of the at least two teams is to be awarded the or each progressive jackpot.

In an embodiment, the determination of whether one of the at least two teams is to be awarded the or each progressive jackpot is based on respective values of contributions of the teams to the or each progressive jackpot.

In an embodiment, the gaming system further comprises at least two jackpot controllers each arranged to communicate with corresponding linked gaming devices played by the at least two teams.

In an embodiment, the at least two jackpot controllers are arranged to determine respective values of contributions of each team to the or each progressive jackpot.

In an embodiment, the at least two jackpot controllers are arranged to determine between them which of the at least two teams is to be awarded the or each progressive jackpot.

In an embodiment, the group game controller is further arranged to award the or each progressive jackpot based on the determination of which of the at least two teams is to be awarded the or each progressive jackpot by the at least two jackpot controllers.

In an embodiment, the at least two teams are formed from players of designated linked gaming devices.

In an embodiment, the linked gaming devices designated to be played by the same team are adjacently located in a bank of said linked gaming devices.

In an embodiment, each of said linked gaming devices comprises a main game controller arranged to conduct the main game.

In an embodiment, each main game controller is arranged to independently conduct the main game for a corresponding linked gaming device.

In an embodiment, each main game controller is arranged to initiate the group game in response to a group game event occurring in the main game.

In an embodiment, the group game controller is further arranged to initiate the group game.

In an embodiment, the linked gaming devices are in data communication with the group game controller.

In a second aspect, the invention provides a gaming system comprising:

a plurality of linked gaming devices each individually operable to play a main game and a group game, each linked gaming device comprising a cabinet, a display mounted within the cabinet, and a game play mechanism mounted to the cabinet incorporating at least one input device, the game play mechanism operable by the player to place wagers in the main game and/or the group game, and a group game controller in data communication with the linked gaming devices comprising a processor and a memory storing game control instructions which enable the group game controller to operate, the group game controller arranged to:

conduct the group game upon initiation for at least two teams of players of the linked gaming devices; and determine which team is to be awarded a prize at completion of the group game.

In a third aspect, the invention provides a gaming system comprising:

means for operating a plurality of linked gaming devices to play a main game and a group game, whereby the group game is played by at least two teams of players of the linked gaming devices;

means for conducting the group game upon initiation for the at least two teams; and means for determining which team is to be awarded a prize at completion of the group game.

In a fourth aspect, the invention provides a method of gaming comprising:

providing a plurality of linked gaming devices operable to play a main game and a group game, the group game being played by at least two teams of players of the linked gaming devices;

conducting the group game upon initiation for the at least two teams; and determining which team is to be awarded a prize at completion of the group game.

In a fifth aspect, the invention provides computer program code which when executed implements the above method.

In a sixth aspect, the invention provides computer readable medium comprising the above program code.

In a seventh aspect, the invention provides transmitting or receiving the above program code.

In an eighth aspect, the-invention provides a data signal comprising the above program code.

BRIEF DESCRIPTION OF SEVERAL VIEWS OF THE DRAWINGS

An exemplary embodiment of the invention will now be described with reference to the accompanying drawings in which.

DETAILED DESCRIPTION OF THE INVENTION

Figure 1:
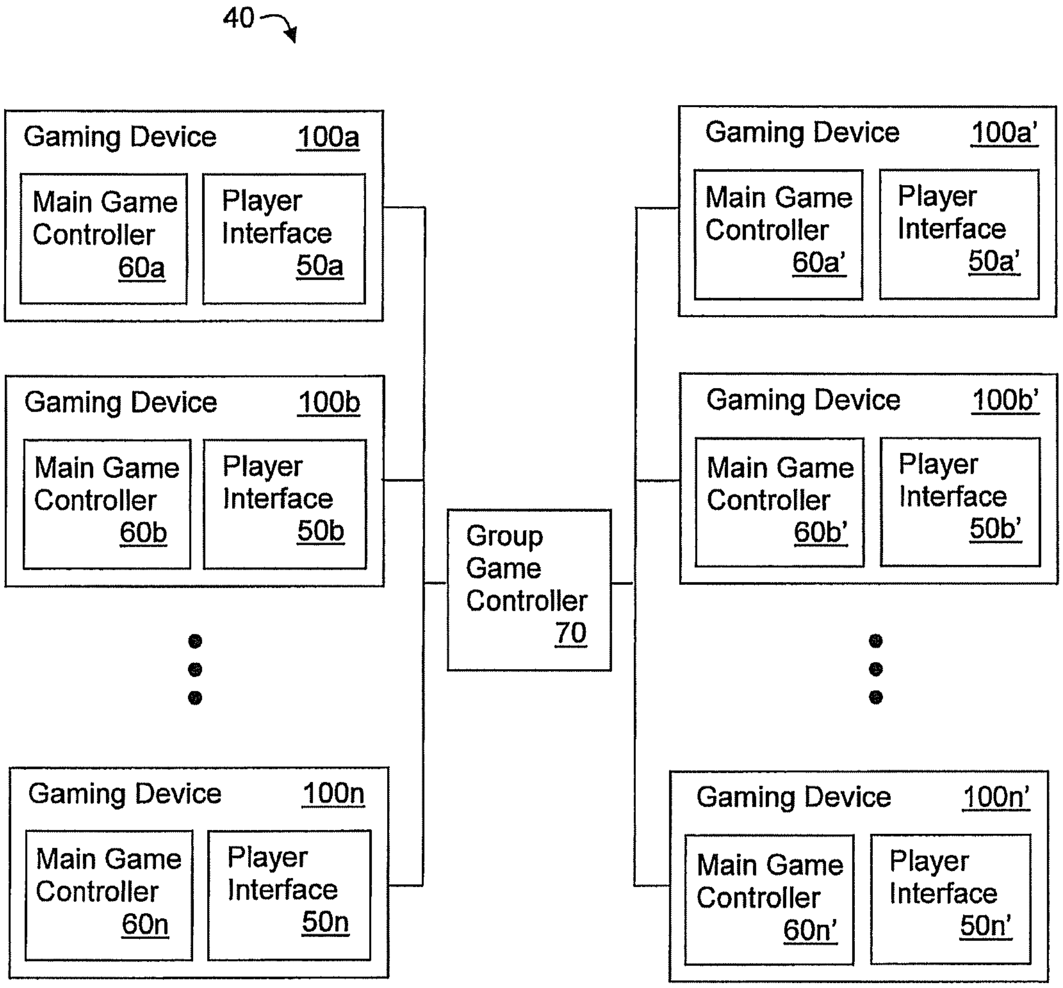
FIG. 1 is a block diagram of the core components of a gaming system.

Referring to the drawings, there is shown a gaming system which includes a plurality of linked gaming devices each individually operable to play a main game and a group game, where the group game is played by at least two teams of players of the linked gaming devices. In the embodiment shown, the gaming system also includes a group game controller arranged to conduct the group game upon initiation for the at least two teams and to determine which team is to be awarded a prize at completion of the group game.

General System Configuration

The gaming system can take a number of different forms. In one form shown in FIG. 1, the core components of a gaming system 40 are shown. The gaming system 40 includes a group game controller 70 arranged to conduct a group game in communication with a plurality of linked gaming devices 100*a*, 100*b*, . . . , 100*n* & 100*a*', 100*b*', . . . , 100*n*' where the communication may include data communication over a network. Persons skilled in the art will appreciate that the gaming devices are linked in the sense that they are connected in a network such that they may participate in the same group game and that this does not require a direct connection between each device. The group game controller 70 is also arranged to conduct the group game for players of the respective linked gaming devices (provided they meet any designated eligibility criteria), upon initiation of the group game, and to determine an outcome of the group game.

In the form shown in FIG. 1, each gaming device 100*a*, 100*b*, . . . , 100*n* & 100*a*', 100*b*', . . . , 100*n*' is individually operable to play the group game and a main game. Each gaming device has a respective main game controller 60*a*, 60*b*, . . . , 60*n* & 60*a*', 60*b*', . . . , 60*n*' arranged to conduct the main game for each player of the respective gaming devices. Also, each gaming device has respective player interfaces 50*a*, 50*b*, . . . , 50*n* & 50*a*', 50*b*', . . . , 50*n*', including respective game play mechanisms including one or more input devices, to allow each player to make an input in both the main and group games. Each player interface is thus arranged to enable manual interaction between a player and the gaming system, and for this purpose includes the input/output components required for the player to enter instructions to play a game and observe game outcomes.

Furthermore, in the form shown in FIG. 1, a group game is played by two teams of players of the linked gaming devices. FIG. 1 shows a first team comprising players of linked gaming devices 100*a*, 100*b*, . . . , 100*n* and a second team comprising players of linked gaming devices 100*a*', 100*b*', . . . , 100*n*'. It will be appreciated by those skilled in the art that more than two teams can play the group game and that these teams may be formed from players of other designated linked gaming devices. In one example, the linked gaming devices designated to be played by the same team are located adjacent each other in a bank.

Gaming Devices

Herein, the term gaming device is used to refer to any device used by a player to play a game and specifically includes stand alone gaming machines and interactive video terminals which implement games in a client/server architecture.

Figure 2:
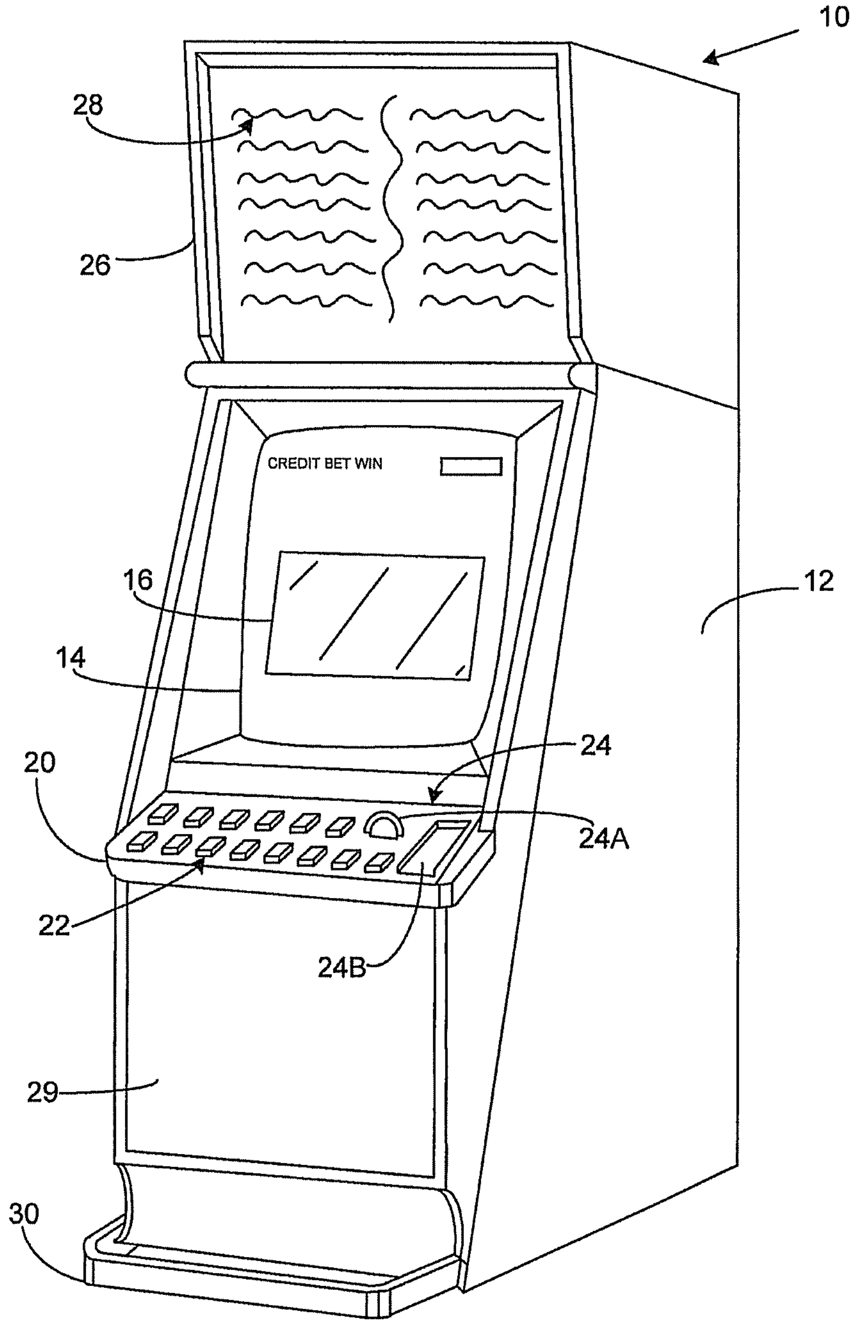
FIG. 2 is a perspective view of a stand alone gaming machine.

A gaming device in the form of a stand alone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. Other gaming machines may configure for ticket in such that they have a ticket reader for reading tickets having a value and crediting the player based on the face value of the ticker. A player marketing module (not shown) having a reading device may also be provided for the purpose of reading a player tracking device, for example as part of a loyalty program. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
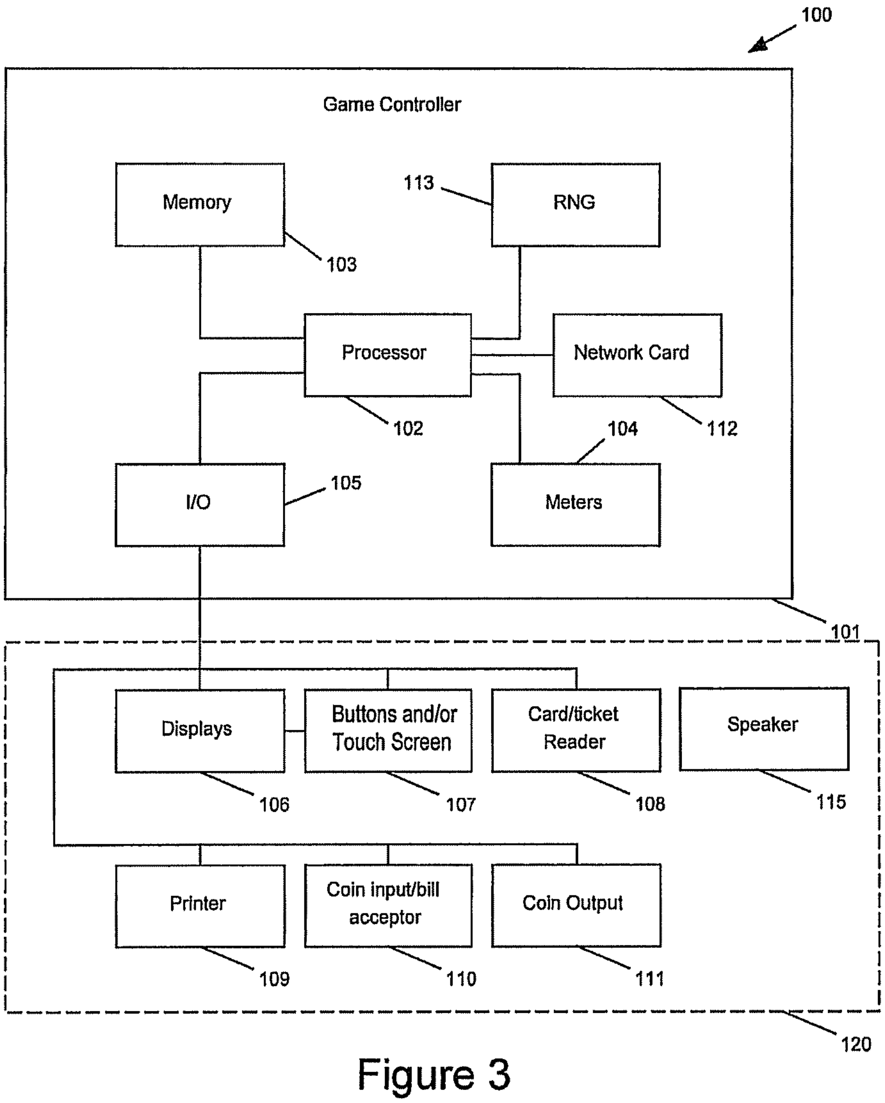
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102 mounted on a circuit board. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen and/or buttons 107 (which provide a game play mechanism), a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation. For example, while buttons or touch screens are typically used in gaming machines to allow a player to place a wager and initiate a play of a game any input device that enables the player to input game play instructions may be used. For example, in some gaming machines a mechanical handle is used to initiate a play of the game.

In addition, the gaming machine 100 may include a communications interface, for example a network card 112. The network card may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
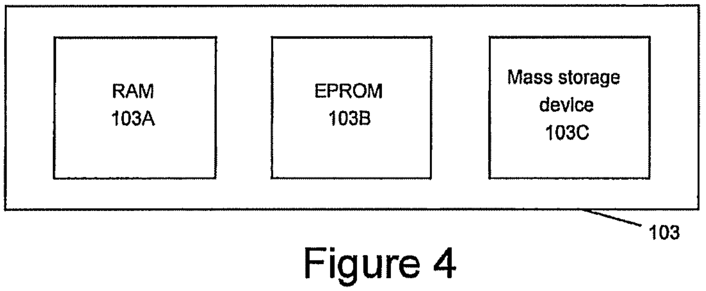
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 1038 or elsewhere.

It is also possible for the operative components of the gaming machine 100 to be distributed, for example input/output devices 106,107,108,109,110,111 to be provided remotely from the game controller 101.

Figure 5:
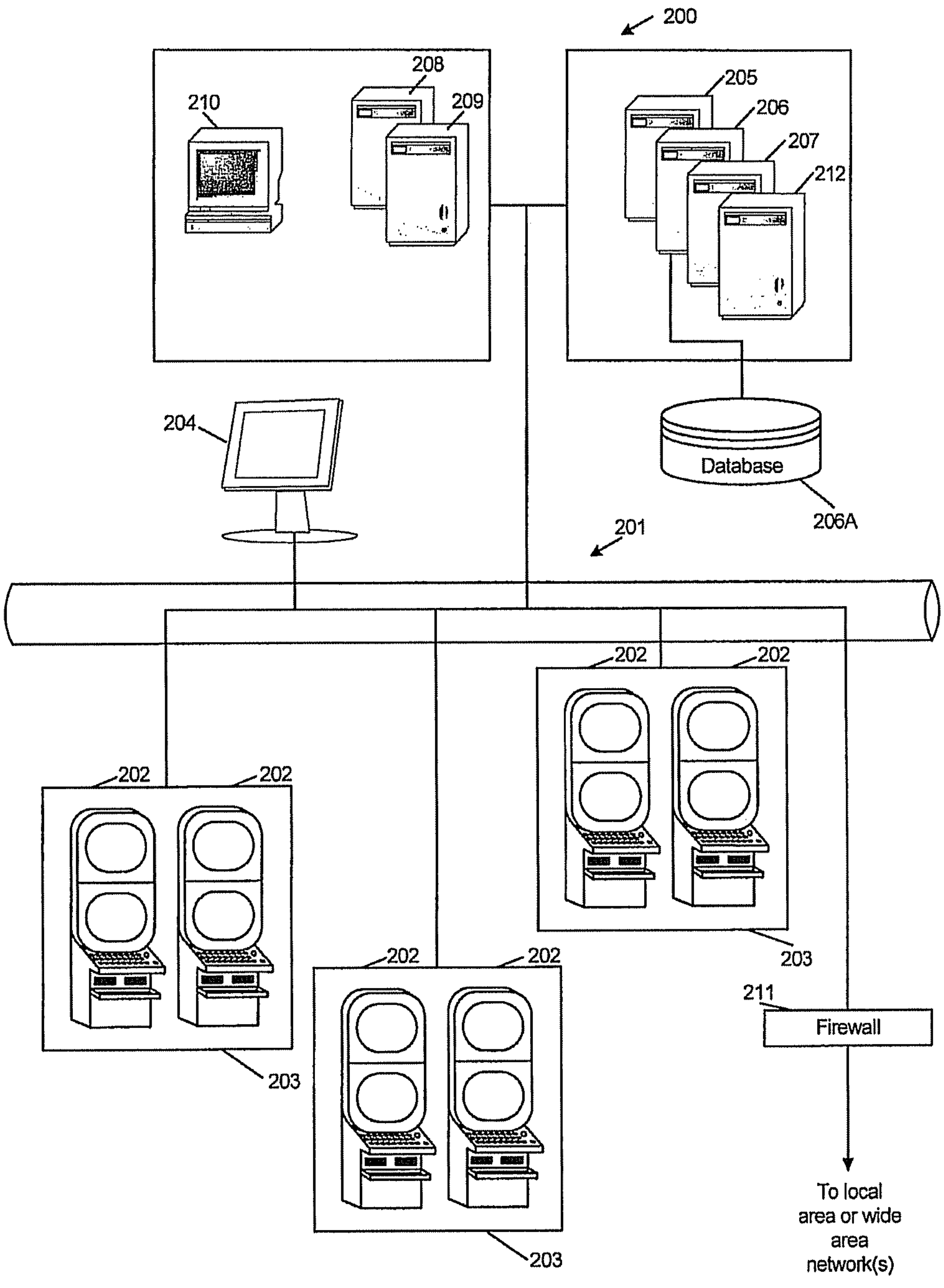
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In an embodiment, the game server 205 provides a group game controller 70 to conduct a group game, as described, for the plurality of gaming machines and a main game controller to conduct a main game, as described, on the gaming machines.

In a thin client embodiment, the game server 205 implements most or all of the game played by a player using the gaming machine 202, and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components. Other client/server configurations are possible, and further details of a client/server architecture can be found in WO 2006/052213 and PCT/SE2006/000559, the disclosures of which are incorporated herein by reference.

A database management server 206 may manage storage of game programs and associated data for downloading or access by the gaming machines 202 in a database 206A. Typically, if the gaming system enables players to participate in a Jackpot game, a Jackpot server 207 will be provided to perform accounting functions for the Jackpot game. A loyalty program server 212 may also be provided.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Further detail of the gaming system

Figure 8:
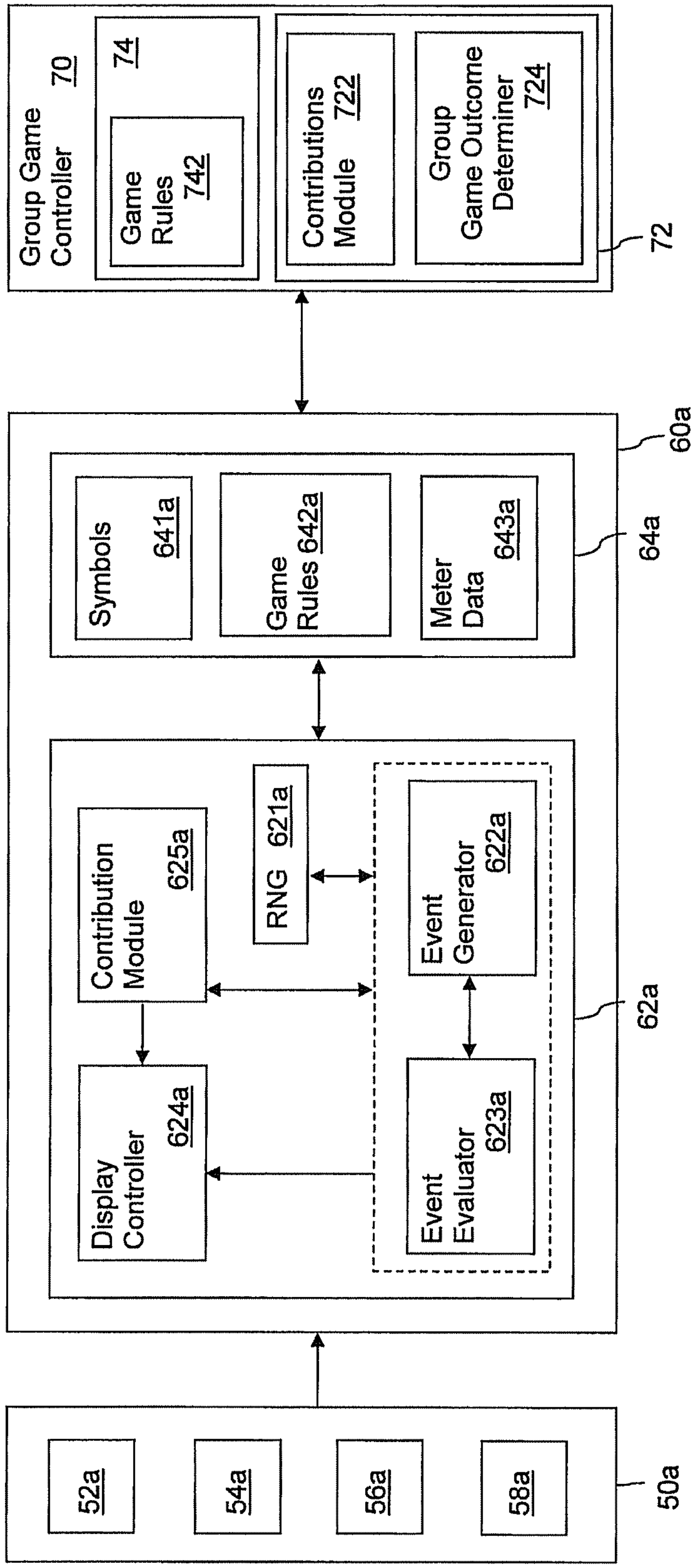
FIG. 8 is a block diagram of a gaming system.

Referring now to FIG. 8, the player interface 50*a* and the main game controller 60*a* of the gaming device 100*a* is shown with the main game controller 60*a* in data communication with the group game controller 70.

In the embodiment shown in FIG. 8, the main game controller 60*a* conducts a main game for a player of the gaming device 100*a* upon input from the player interface 50*a*. Components of the player interface 50*a* may vary from embodiment to embodiment but will typically include a credit mechanism 52*a* to enable a player to input credits and receive payouts, one or more displays 54*a*, a game play mechanism 56*a* including one or more input devices that enable a player to input game play instructions (e.g. to place a wager), and one or more speakers 58*a*. The game play mechanism 56*a* of the player interface 50*a* may be in the form of an input device such as a touch screen and/or buttons to input player instructions to the main game controller 60*a*.

The main game controller 60*a* is in data communication with the player interface 50*a* and includes a processor 62*a* to process game play instructions for a main game in accordance with game play rules and output game play outcomes to the display 54*a* of the gaming device 100*a*. Typically, the game play rules are stored as program code in a memory 64*a* as game rules 642*a* but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

The group game controller 70 also includes a processor 72 that processes the game play instructions for a group game in accordance with game play rules and outputs game play outcomes to the respective displays of the linked gaming devices 100*a*, 100*b*, . . . , 100*n* & 100*a*', 100*b*', . . . , 100*n*' illustrated in FIG. 1. Also, it will be appreciated that group game play rules can either be stored as program code in a memory 74 of the group game controller 70 as game rules 742 or be hardwired.

FIG. 8 shows the group game controller 70 in communication with only the gaming device 100*a*, which is played by a player from a first team of players, however it will be noted that, in the embodiment, the group game controller 70 is in communication with the plurality of linked gaming devices 100*a*, 100*b*, . . . , 100*n* & 100*a*', 100*b*', . . . , 100*n*' played by the other teams.

In an embodiment, the player operates the game play mechanism 56*a* of the player interface 50*a* to make a selection and input game instructions (selected from a plurality of available instructions) and a wager to the main game controller 60*a*. The inputted instructions and wager are then used to initiate play of a main game for the gaming device 100*a*.

In FIG. 8, the processor 62*a* of main game controller 60*a* is shown implementing a number of modules based on program code and data stored in memory 64*a* to conduct the main game. The modules include an event generator 622*a* which generates events in the main game by employing random number generator 621*a* to randomly select symbols from a set of symbols specified by symbol data 641*a* to carry out the main game. The selected symbols are advised to the display controller 624*a* which causes them to be displayed on display 54*a* at designated symbol display positions. For example, the main game may be a spinning reel type game where the player inputs a wager and instructions to select a number of lines to be played in each game or each game round of the main game. In the example, the symbols 641 a are displayed in symbol display positions arranged in columns, generally representing reels, and the symbols 641*a* may include designated symbols to indicate that a group game is to be initiated (e.g. wild symbols).

The modules implemented by the processor 62*a* also include an event evaluator 623*a* arranged to evaluate events generated by the event generator 622*a* against those designated by the game rules 642*a*. For example, in the spinning reel type game, the event evaluator 623*a* evaluates whether a group game is to be initiated based on the occurrence of a group game event (e.g. the occurrence of designated wild symbols). In addition, the event evaluator 623*a* may evaluate whether a designated winning combination of symbols has occurred in the main game so that a prize can be awarded to the player of the gaming device 100*a*. The likelihood of the occurrence of such events may be designated and stored in the game rules 642*a* and accordingly employed by the event generator 622*a*.

In another example, a group game is initiated by the group game controller 70 based on stored group game rules 742 and communicated to the plurality of linked gaming devices 100*a*, 100*b*, . . . , 100*n* & 100*a*', 100*b*', . . . , 100*n*' so that the group game can be conducted for the two teams. In the example, the group game may be initiated according to a designated time duration expiring between successive conducted group games or a designated value of contributions made by the teams to one or more progressive jackpots. It will be appreciated that other initiation criteria may be employed by the group game controller 70, such as initiating the group game at a particular time of day.

As described, each linked gaming device is individually operable to play both the main game and the group game. The group game is played by the two teams of players of the linked gaming devices, upon initiation, and the prize to be awarded at the completion of the group game is at least one progressive jackpot. In the embodiment shown in FIG. 8, the processor 62*a* implements a contribution module 625*a* arranged to contribute a designated portion of a wager inputted in the main game to the or each progressive jackpot. In another embodiment, each team of players contributes to the or each progressive jackpot during play of the group game. In this case, either the respective contributions module 625*a* or a group game contributions module 722 can be arranged to contribute a designated portion of a wager in the group game to the or each progressive jackpot.

In an example, each team of players of the linked gaming devices contributes to a progressive jackpot. That is, the first team comprising players of linked gaming devices 100*a*, 100*b*, . . . , 100*n* contributes to a progressive jackpot via respective contribution modules 625*a*, 625*b*, . . . , 625*n* and the second team of players of linked gaming devices 100*a*', 100*b*', . . . , 100*n*' contributes to the progressive jackpot via respective contribution modules 625*a*', 625*b*', . . . , 625*n*' (only contribution module 625*a* is shown in FIG. 8). To collate these contributions to the progressive jackpot, the group game contributions module 722 collates information from respective contribution modules and, in turn, communicates this information to a group game outcome determiner 724 to determine the outcome of the group game.

In the example, the group game outcome determiner 724 determines which team to award the progressive jackpot based on a designated value of contributions being reached. It is envisaged that the designated value of contributions is stored in game rules 742.

In another example, each team of players of the linked gaming devices contributes to a corresponding team progressive jackpot. In this example, the contribution module 722 collates the contributions from the two teams to their respective progressive jackpots so that the group game outcome determiner 724 can determine whether one team is to be awarded the progressive jackpot corresponding to their team, another team, or a combination of both, based on the respective values of contributions of teams to their corresponding team progressive jackpots and any designated game rules.

Figure 7:
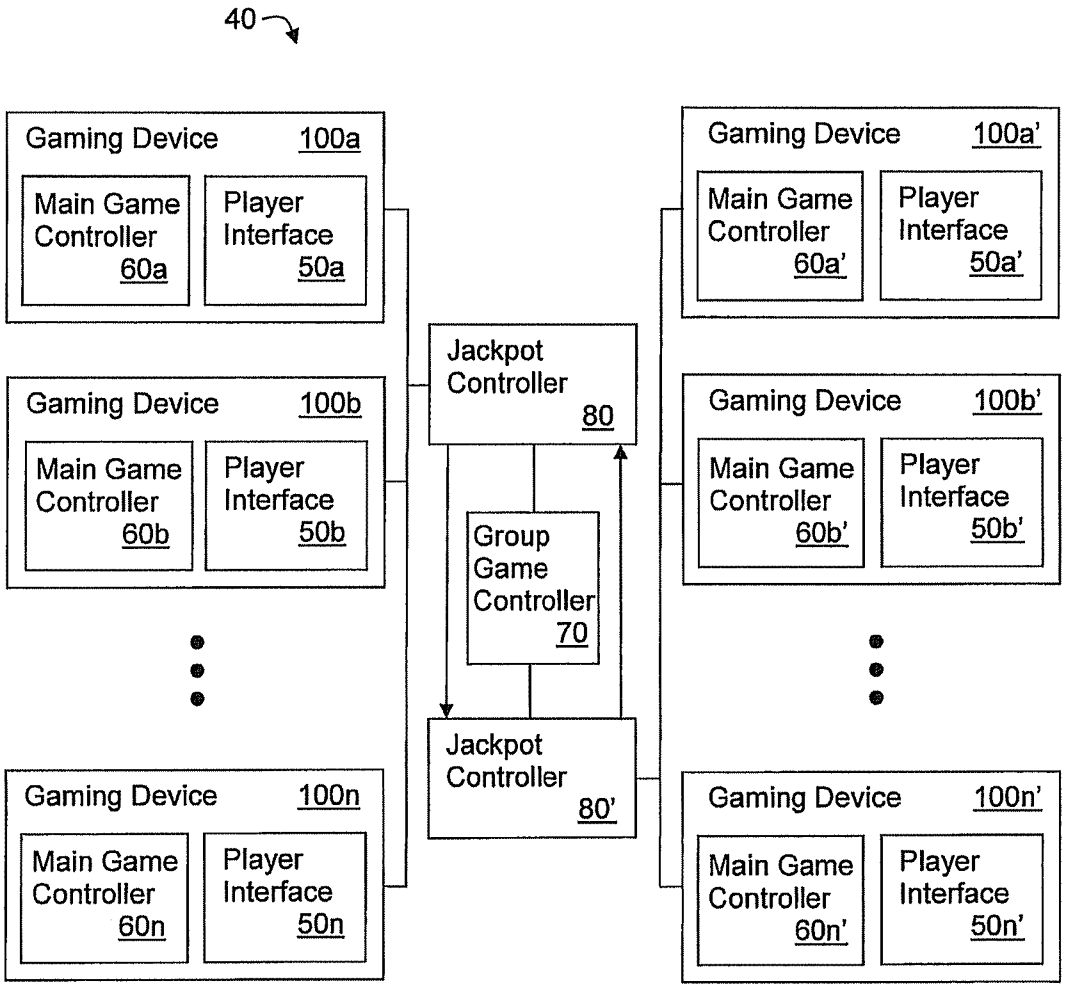
FIG. 7 is a further block diagram of the core components of a gaming system.

Referring back to the embodiment shown in FIG. 7, the jackpot controllers 80 and 80' may also include contribution modules which collate contributions from the teams to their corresponding progressive jackpots as described above. In this embodiment, the jackpot controllers 80 and 80' are arranged to include respective group game outcome determiners to determine which team is to be awarded their own progressive jackpot, the other team's progressive jackpot, or a combination of both, based on the respective value of the contributions. In addition, it is envisaged that the jackpot controllers 80 and 80' may be arranged to determine whether a portion of either progressive jackpot is to be awarded to one of the teams.

In the embodiment, the respective jackpot controllers 80 and 80' are arranged to determine which team is to be awarded a progressive jackpot when a value of a team's contributions reaches a designated value. Once the contributions reach this value, one of the jackpot controllers communicates this determination to the other jackpot controller so that the progressive jackpot can be awarded. Furthermore, the determination may then be communicated to the group game controller 70 so as to award the progressive jackpot to the correct team. It will be appreciated by those skilled in the art that when a progressive jackpot is awarded to a team the corresponding players share the jackpot in a manner based on designated criteria, such as amount wagered in the main game.

Figure 6:
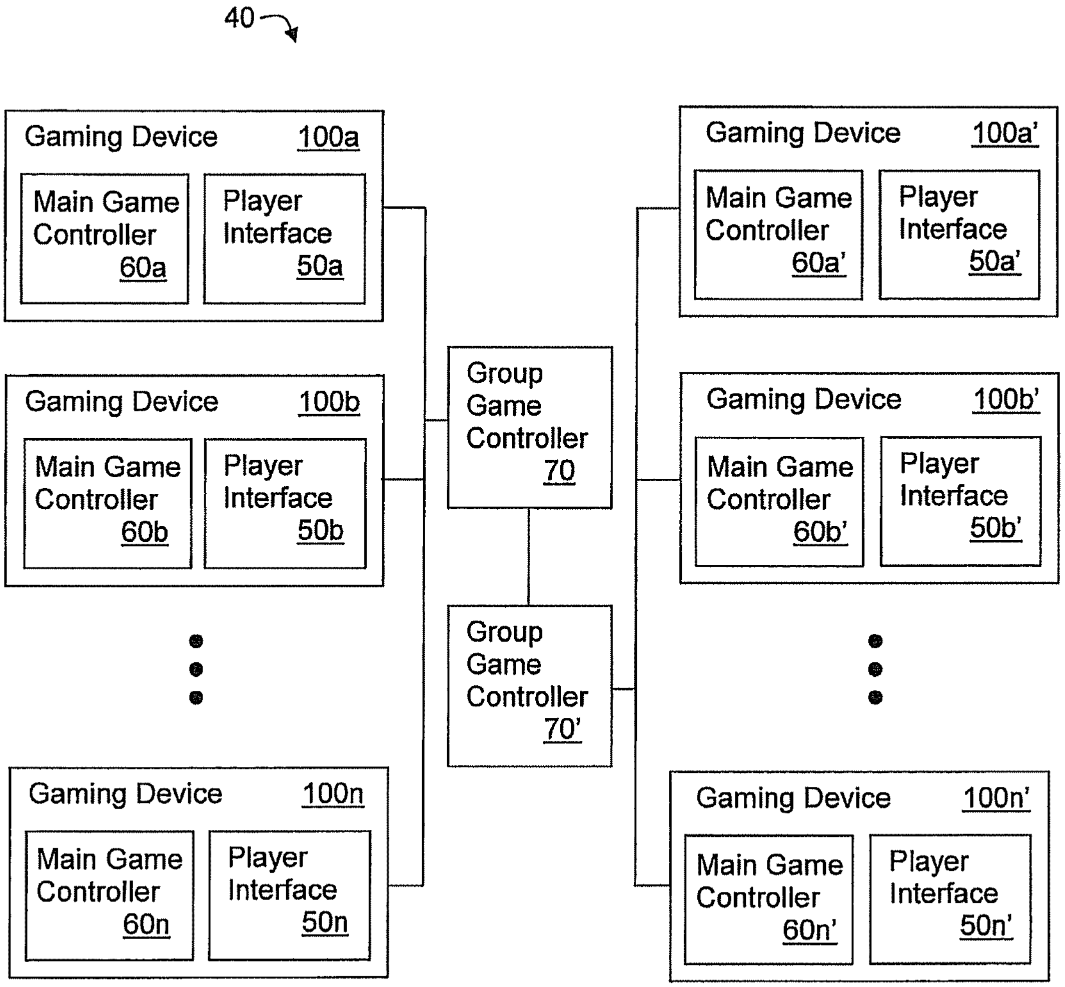
FIG. 6 is a further block diagram of the core components of a gaming system.

Persons skilled in the art will appreciate that other configurations are possible. For example, FIG. 6 shows an alternative embodiment of the gaming system 40 including a first team group game controller 70 in communication with the first team of linked gaming devices 100*a*, 100*b*, . . . , 100*n* and a second team group game controller 70' in communication with the second team of linked gaming devices 100*a*', 100*b*', . . . , 100*n*'. In this case, the group game controllers 70 and 70' are arranged to conduct the group game for players of the respective teams of gaming devices and to determine between them an outcome of the group game, e.g. which team is to be awarded the prize at completion of the group game.

FIG. 7 shows another embodiment of the gaming system 40. In the embodiment, the prize to be awarded at the completion of the group game is at least one progressive jackpot deriving contributions from the linked gaming devices 100*a*, 100*b*, . . . , 100*n* & 100*a*', 100*b*', . . . , 100*n*'. In the embodiment, each team contributes to a progressive jackpot and the gaming system 40 includes jackpot controllers 80 and 80', in communication with respective teams of linked gaming devices 100*a*, 100*b*, . . . , 100*n* & 100*a*', 100*b*', . . . , 100*n*', arranged to determine respective contributions of each team to the progressive jackpot. In this case, the group game controller 70 conducts a group game and the jackpot controllers 80 and 80' determine between them which team is to be awarded the progressive jackpot based on the respective contributions of the teams. The jackpot controllers 80 and 80' then communicate this determination to the group game controller 70 to award the progressive jackpot at the completion of the group game.

An example of the above method of gaming is described with reference to FIG. 1. The example includes providing a plurality of linked gaming devices 100*a*, 100*b*, . . . , 100*n* & 100*a*', 100*b*', . . . , 100*n*' and forming two teams from players of designated linked gaming devices (e.g. one team from designated linked gaming devices 100*a*, 100*b*, . . . , 100*n* and one team from designated linked gaming devices 100*a*', 100*b*', . . . , 100*n*'). As above, the linked gaming devices designated to be played by the same team are located adjacent each other in banks of linked gaming devices. In the example, each bank of linked gaming devices is designated to belong to the same team and indicated so by signage illustrating that each bank is a 'pirate ship' and that the players of the linked gaming devices in each bank are 'pirates' on the same team competing against other 'pirates' in another 'pirate ship'. It is to be appreciated by those skilled in the art that the banks of linked gaming devices need not be located in the same casino. For example, competing 'pirate ships' may be formed from banks of linked gaming devices located in different casinos, in different states or in different countries.

In the example, upon initiation of the group game, the 'pirate ships' are seen on respective linked gaming device displays to attack each other. For example, one 'pirate ship' may be seen as firing cannons at another 'pirate ship' whenever the value of the first ship's corresponding contributions to a first team progressive jackpot reach a designated value (e.g. $20) and 'robbing' another 'pirate ship' of a corresponding portion of their progressive jackpot. The linked gaming devices may also have additional player interfaces to enhance this experience for the players, such as subwoofers and smoke generators. When the value of the first 'pirate ship's' corresponding contributions reaches a further designated value (e.g. $500) the first 'pirate ship' sinks another 'pirate ship' and takes their progressive jackpot for distribution amongst the 'pirates' of the first 'pirate ship'.

Figure 9:
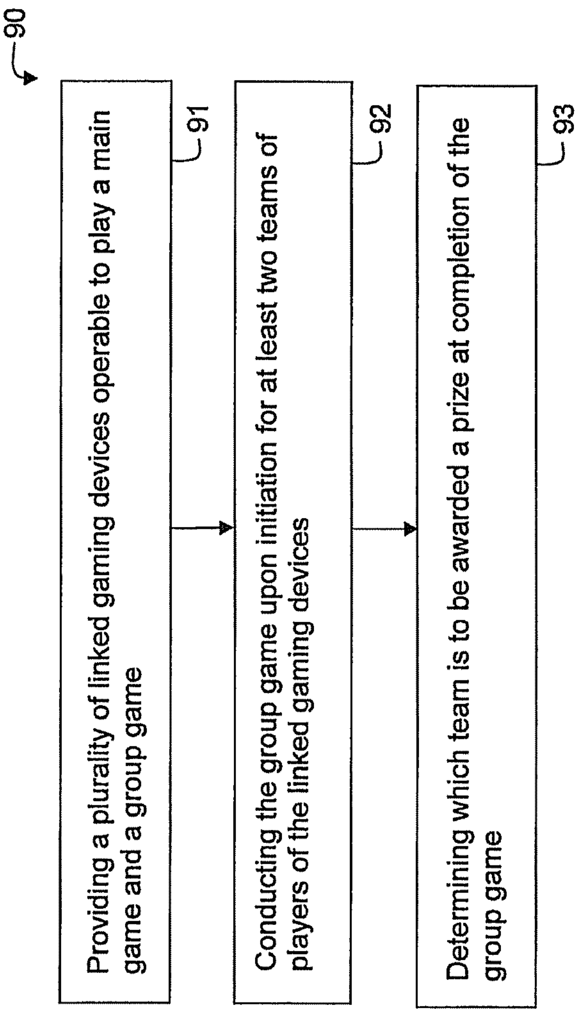
FIG. 9 is a flow chart of a method of an embodiment.

A method 900 of gaming is summarised in FIG. 9 and involves the steps of providing 910 a plurality of linked gaming devices operable to play a main game and a group game, conducting 920 the group game upon initiation for at least two teams of players of the gaming devices, and determining 930 which team is to be awarded a prize at completion of the group game.

Further aspects of the above described method of gaming will be apparent from the above description of the system. It will be appreciated that at least part of the method will be implemented digitally by a processor. Persons skilled in the art will also appreciate that the method could be embodied in program code. The program code could be supplied in a number of ways, for example on a tangible computer readable storage medium, such as a disc or a memory (for example, that could replace part of memory 103) or as a data signal (for example, by transmitting it from a server). Persons skilled in the art, will appreciate that program code provides a series of instructions executable by the processor.

It will be understood to persons skilled in the art of the invention that many modifications may be made without departing from the spirit and scope of the invention, in particular it will be apparent that certain features of embodiments of the invention can be employed to form further embodiments.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A gaming system comprising:

a plurality of linked gaming devices each individually operable to play a main game and a group game, whereby the group game is played by actions of at least two teams of players of the linked gaming devices;

an event evaluator configured to evaluate whether said group game is to be initiated based on at least one of a plurality of predefined game rules, and to determine when contributions from the at least two teams reach a designated value of contributions to a first prize and a second prize; and a group game controller configured to 1) conduct the group game for the at least two teams when said event evaluator determines that contributions from the at least two teams have reached said designated value of contributions to said first prize and said second prize, by associating a first of the at least two teams with the first prize and a second of the at least two teams with the second prize, and by incrementing a value of the first prize and a value of the second prize in response to respective actions of the first and second teams of players, said incrementing of a value of the first prize causing a corresponding decrement to the value of the second prize and said incrementing of a value of the second prize causing a corresponding decrement to the value of the first prize, and 2) determine which team is to be awarded a group game prize based on which of the first prize and second prize first reaches a predefined value.

2. A gaming system as claimed in claim 1, wherein the group game prize is at least one progressive jackpot.

3. A gaming system as claimed in claim 2, wherein each team contributes to said at least one progressive jackpot.

4. A gaming system as claimed in claim 2, wherein each team contributes to a corresponding team progressive jackpot of the at least one progressive jackpot.

5. A gaming system as claimed in claim 4, wherein the group game controller is further configured to determine whether one of the at least two teams is to be awarded a progressive jackpot corresponding to another team.

6. A gaming system as claimed in claim 5, wherein the determination of whether one of the at least two teams is to be awarded the progressive jackpot corresponding to another team is based on respective values of contributions of the teams to the respective corresponding team progressive jackpots.

7. A gaming system as claimed in claim 3, wherein the group game controller is further configured to determine whether one of the at least two teams is to be awarded said at least one progressive jackpot.

8. A gaming system as claimed in claim 7, wherein the determination of whether one of the at least two teams is to be awarded said at least one progressive jackpot is based on respective values of contributions of the teams to said at least one progressive jackpot.

9. A gaming system as claimed in claim 3, further comprising at least two jackpot controllers each configured to communicate with corresponding linked gaming devices played by the at least two teams.

10. A gaming system as claimed in claim 9, wherein the at least two jackpot controllers are configured to determine respective values of contributions of each team to said at least one progressive jackpot.

11. A gaming system as claimed in claim 10, wherein the at least two jackpot controllers are configured to determine between them which of the at least two teams is to be awarded said at least one progressive jackpot.

12. A gaming system as claimed in claim 11, wherein the group game controller is further configured to award said at least one progressive jackpot based on the determination of which of the at least two teams is to be awarded said at least one progressive jackpot by the at least two jackpot controllers.

13. A gaming system as claimed in claim 1, wherein the at least two teams are formed from players of designated linked gaming devices.

14. A gaming system as claimed in claim 13, wherein the linked gaming devices designated to be played by the same team are adjacently located in a bank of said linked gaming devices.

15. A gaming system as claimed in claim 1, wherein each of said linked gaming devices comprises a main game controller configured to conduct the main game.

16. A gaming system as claimed in claim 15, wherein each main game controller is configured to independently conduct the main game for a corresponding linked gaming device.

17. A gaming system as claimed in claim 15, wherein each main game controller is configured to initiate the group game in response to a group game event occurring in the main game.

18. A gaming system as claimed in claim 1, wherein the group game controller is further configured to initiate the group game.

19. A gaming system claimed in claim 1, wherein the linked gaming devices are in data communication with the group game controller.

20. A gaming system comprising:

a plurality of linked gaming devices each individually operable to play a main game and a group game, each linked gaming device comprising a cabinet, a display mounted within the cabinet, and a game play mechanism mounted to the cabinet incorporating at least one input device, the game play mechanism operable by the player to place wagers in the main game and/or the group game, and a group game controller in data communication with the linked gaming devices comprising a processor and a memory storing game control instructions which enable the group game controller to operate, the group game controller configured to:

evaluate whether said group game is to be initiated based on at least one of a plurality of predefined game rules;

determine when contributions from the at least two teams reach a designated value of contributions to a first prize and a second prize;

conduct the group game for at least two teams of players of the linked gaming devices when said event evaluator determines that contributions from the at least two teams have reached said designated value of contributions to said first prize and said second prize, wherein said conducting includes associating a first of the at least two teams with the first prize and a second of the at least two teams with the second prize, and incrementing a value of the first prize and a value of the second prize in response to respective actions of the first and second teams of players, said incrementing of a value of the first prize causing a corresponding decrement to the value of the second prize and said incrementing of a value of the second prize causing a corresponding decrement to the value of the first prize; and determine which team is to be awarded a group game prize based on which of the first prize and second prize first reaches a predefined value.

21. A gaming system comprising:

means for operating a plurality of linked gaming devices to play a main game and a group game, whereby the group game is played by actions of at least two teams of players of the linked gaming devices;

means for evaluating whether said group game is to be initiated based on at least one of a plurality of predefined game rules;

means for determining when contributions from the at least two teams reach a designated value of contributions to a first prize and a second prize;

means for conducting the group game for the at least two teams when said event evaluator determines that contributions from the at least two teams have reached said designated value of contributions to said first prize and said second prize, wherein a first of the at least two teams is associated with the first prize and a second of the at least two teams is associated with the second prize, and wherein a value of the first prize and a value of the second prize increment in response to respective actions of the first and second teams of players; and means for determining which team is to be awarded a group game prize based on which of the first prize and second prize first reaches a predefined value, wherein an increment to the first prize causes a corresponding decrement to the second prize and an increment to the second prize causes a corresponding decrement to the first prize.

22. A method of gaming comprising:

providing a plurality of linked gaming devices operable to play a main game and a group game, the group game being played by at least two teams of players of the linked gaming devices;

evaluating whether said group game is to be initiated based on at least one of a plurality of predefined game rules;

determining when contributions from the at least two teams reach a designated value of contributions to a first prize and a second prize;

conducting the group game for the at least two teams when said event evaluator determines that contributions from the at least two teams have reached said designated value of contributions to said first prize and said second prize, by associating a first of the at least two teams with the first prize and a second of the at least two teams with the second prize, and incrementing a value of the first prize and a value of the second prize in response to respective actions of the first and second teams of players, said incrementing of a value of the first prize causing a corresponding decrement to the value of the second prize and said incrementing of a value of the second prize causing a corresponding decrement to the value of the first prize; and determining which team is to be awarded a group game prize based on which of the first prize and second prize first reaches a predefined value.

23. A method of gaming as claimed in claim 22, wherein the group game prize is at least one progressive jackpot.

24. A method of gaming as claimed in claim 23, and further comprising each team contributing to said at least one progressive jackpot.

25. A method of gaming as claimed in claim 24, and further comprising each team contributing to a corresponding team progressive jackpot of the at least one progressive jackpot.

26. A method of gaming as claimed in claim 25, and further comprising determining whether one of the at least two teams is to be awarded a progressive jackpot corresponding to another team.

27. A method of gaming as claimed in claim 26, and further comprising determining whether one of the at least two teams is to be awarded the progressive jackpot corresponding to another team based on respective values of contributions of the teams to the respective corresponding team progressive jackpots.

28. A method of gaming as claimed in claim 24, and further comprising determining whether one of the at least two teams is to be awarded said at least one progressive jackpot.

29. A method of gaming as claimed in claim 28, and further comprising determining whether one of the at least two teams is to be awarded said at least one progressive jackpot based on respective values of contributions of the teams to said at least one progressive jackpot.

* * * * *